(12) United States Patent
Xu et al.

(10) Patent No.: US 8,997,090 B2
(45) Date of Patent: Mar. 31, 2015

(54) INSTALLING AN OPERATING SYSTEM IN A HOST SYSTEM

(71) Applicant: International Business Machines Corporation, Armonk, NY (US)

(72) Inventors: Ye Xu, Shanghai (CN); Bin Yan, Shanghai (CN); Wen Jie Yu, Shanghai (CN); Binqi Zhang, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 88 days.

(21) Appl. No.: 13/783,651

(22) Filed: Mar. 4, 2013

(65) Prior Publication Data

US 2013/0254759 A1  Sep. 26, 2013

(30) Foreign Application Priority Data

Mar. 26, 2012 (CN) .......................... 2012 1 0081997

(51) Int. Cl.
*G06F 9/445* (2006.01)

(52) U.S. Cl.
CPC ........................................ *G06F 8/61* (2013.01)
USPC ............................ 717/174; 717/175; 717/178

(58) Field of Classification Search
None
See application file for complete search history.

(56) References Cited

U.S. PATENT DOCUMENTS

| | | | |
|---|---|---|---|
| 7,290,258 B2 | 10/2007 | Steeb et al. | |
| 7,299,345 B2 | 11/2007 | Van Cleve et al. | |
| 7,484,084 B1 * | 1/2009 | Ranaweera et al. | 713/1 |
| 7,822,961 B2 | 10/2010 | Cepulis et al. | |
| 8,042,107 B2 * | 10/2011 | Amodio et al. | 717/175 |
| 8,117,612 B2 * | 2/2012 | Flegg et al. | 717/178 |
| 8,225,309 B2 * | 7/2012 | Zhang et al. | 717/175 |
| 8,417,774 B2 * | 4/2013 | Flynn et al. | 709/204 |
| 8,495,626 B1 * | 7/2013 | Hanes et al. | 717/178 |
| 8,732,692 B2 * | 5/2014 | Fangmeier et al. | 717/176 |
| 2002/0124245 A1 | 9/2002 | Maddux et al. | |
| 2005/0198629 A1 * | 9/2005 | Vishwanath | 717/174 |
| 2006/0195839 A1 * | 8/2006 | Lin et al. | 717/174 |

(Continued)

FOREIGN PATENT DOCUMENTS

WO   WO2009064781 A2   5/2009

OTHER PUBLICATIONS

Sapuntzakis et al. Virtual Appliances for Deploying and Maintaining Software, LISA vol. 3, Oct. 2003, pp. 181-194. Retrieved on [Jan. 30, 2015] Retrieved from the Internet: URL<http://static.usenix.org/legacy/publications/library/proceedings/lisa03/tech/full_papers/sapuntzakis/sapuntzakis_html/>.*

(Continued)

*Primary Examiner* — Thuy Dao
*Assistant Examiner* — Cheneca Smith
(74) *Attorney, Agent, or Firm* — Katherine S. Brown; Jeffrey L. Streets

(57) ABSTRACT

Method and system for installing an operating system (OS) in a host computer system. The method comprises: receiving user parameters required during OS installation in a pre-boot execution environment and generating an unattended installation pack; transferring the unattended installation pack to a baseboard management controller (BMC); sending a control command to the BMC to instruct the BMC to mount the installation pack as a universal serial bus (USB) key; and installing the OS in the host in response to receiving a reply from the BMC, wherein during the OS installation process, the unattended pack is obtained from the USB key so as to acquire the user parameters in the installation process. The method and system make it possible for the OS installation to use no external storage or network apparatus and thus the required resources are reduced in the OS installation for a host.

6 Claims, 2 Drawing Sheets

(56) References Cited

U.S. PATENT DOCUMENTS

| | | | |
|---|---|---|---|
| 2007/0169116 A1* | 7/2007 | Gujarathi et al. | 717/174 |
| 2008/0092134 A1 | 4/2008 | Zhang et al. | |
| 2009/0083733 A1* | 3/2009 | Chen et al. | 717/178 |
| 2010/0100610 A1 | 4/2010 | Bezanson et al. | |
| 2010/0192145 A1 | 7/2010 | Liles et al. | |
| 2011/0072255 A1 | 3/2011 | Gopalakrishnan et al. | |
| 2011/0246981 A1* | 10/2011 | Braun et al. | 717/175 |

OTHER PUBLICATIONS

Tyndall, John B. The windows 7 build key: redesigning and automating image deployment. Proceedings of the 39th annual ACM SIGUCCS conference on User services. ACM, 2011 Retrieved on [Jan. 30, 2015] Retrieved from the Internet: URL<http://dl.acm.org/citation.cfm?id=2070392>.*

Wang et al., "Simplifying Custom Microsoft Windows Deployments", Systems Management, Dell Power Solutions, 2010 Issue 3, pp. 93-96. (This document only identifies the year of publication (without the month), but the year of publication is sufficiently earlier than the effective U.S. filing date and any foreign priority date so that the particular month of publication is not in issue. See MPEP 609.04(a)).

* cited by examiner

INSTALLING AN OPERATING SYSTEM IN A HOST SYSTEM

CROSS-REFERENCE TO RELATED APPLICATIONS

This application is based on and claims the benefit of priority under 35 U.S.C. §119 to Chinese Patent Application 201210081997.9, filed on Mar. 26, 2012, the entire text of which is specifically incorporated by reference herein.

BACKGROUND

1. Field of the Invention

The present invention relates to operating system installation, and more specifically, to a method and apparatus for installing an operating system in a host system.

2. Background of the Related Art

In a host system, operating system (OS) installation is a time consuming process. In a typical installation process, a user starts up an OS image and the OS installation process is started. During the OS installation process, an OS installation program requests that the user input parameters through the human computer interaction interface, such as the parameters about diskette format policy, time zone setting, language selection, etc. For some hardware environments, the OS installation program requests that the user install a specific driver, for example a redundant array of independent disks (RAID) driver, etc., otherwise, the installation will not proceed. Usually, it will take from 30 minutes to 90 minutes in order to complete an OS installation process. During that time, the user has to wait in front of the host to answer the questions from the OS installation program.

Due to drawbacks of the time and human resource consumption for the above process, a method of unattended OS installation was developed, in which, after the user starts up an OS image and the OS installation process is started, the user can leave the host, without waiting in front of the host. The OS installation process does not need user interaction. Rather, the unattended OS installation method may use an answer file that provides all required user parameters, drivers and/or application programs.

Existing unattended OS installation methods require the answer file and the drivers to be stored on an external storage device. In that solution, an extra external storage device (usually the storage can be a USB storage device, a removable hard disk or a floppy disk, etc.) is used to store the answer file and drivers missing from the OS image.

BRIEF SUMMARY

One embodiment of the present invention provides a method for installing operating system (OS) in a host system, comprising: receiving user parameters required during OS installation in a pre-boot execution environment and generating an unattended installation pack; transferring the unattended installation pack to a baseboard management controller (BMC); sending a control command to the BMC to instruct the BMC to mount the installation pack as a universal serial bus (USB) key; and installing the OS in the host in response to receiving a reply from the BMC, wherein during the OS installation process, the unattended pack is obtained from the USB key so as to acquire the user parameters in the installation process.

Another embodiment of the present invention provides a system for installing operating system in a host system, comprising: receiving module, configured to receive user parameters required during OS installation in a pre-boot execution environment and generate an unattended installation pack; transferring module, configured to transfer the unattended installation pack to a baseboard management controller; command module, configured to send a control command to the BMC to instruct the BMC to mount the installation pack as a USB key; and installing module, configured to install the OS in the host in response to receiving a reply from BMC, wherein during the OS installation process, the unattended pack is obtained from the USB key so as to acquire the user parameters in the installation process.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference number generally refers to the same components in the embodiments of the present disclosure.

DETAILED DESCRIPTION

Some embodiments of the present invention will be described in more detail with reference to the accompanying drawings. However, the present invention can be implemented in various manners, and thus should not be construed to be limited to the embodiments specifically disclosed herein. On the contrary, the embodiments disclosed are provided to convey an understanding of the scope of the present invention to those having ordinary skill in the art.

Due to the drawbacks of the existing technology for unattended installation of an operating system, embodiments of the present invention provide a method and apparatus for installing an operating system in a host system without requiring the use of an external storage device or network apparatus. Accordingly, the required resources for installing an operating system are reduced. In certain embodiments, operating systems may be deployed in multiple host computer systems at the same time with requiring an equivalent number of external storage devices or network booting apparatus.

Figure 1:
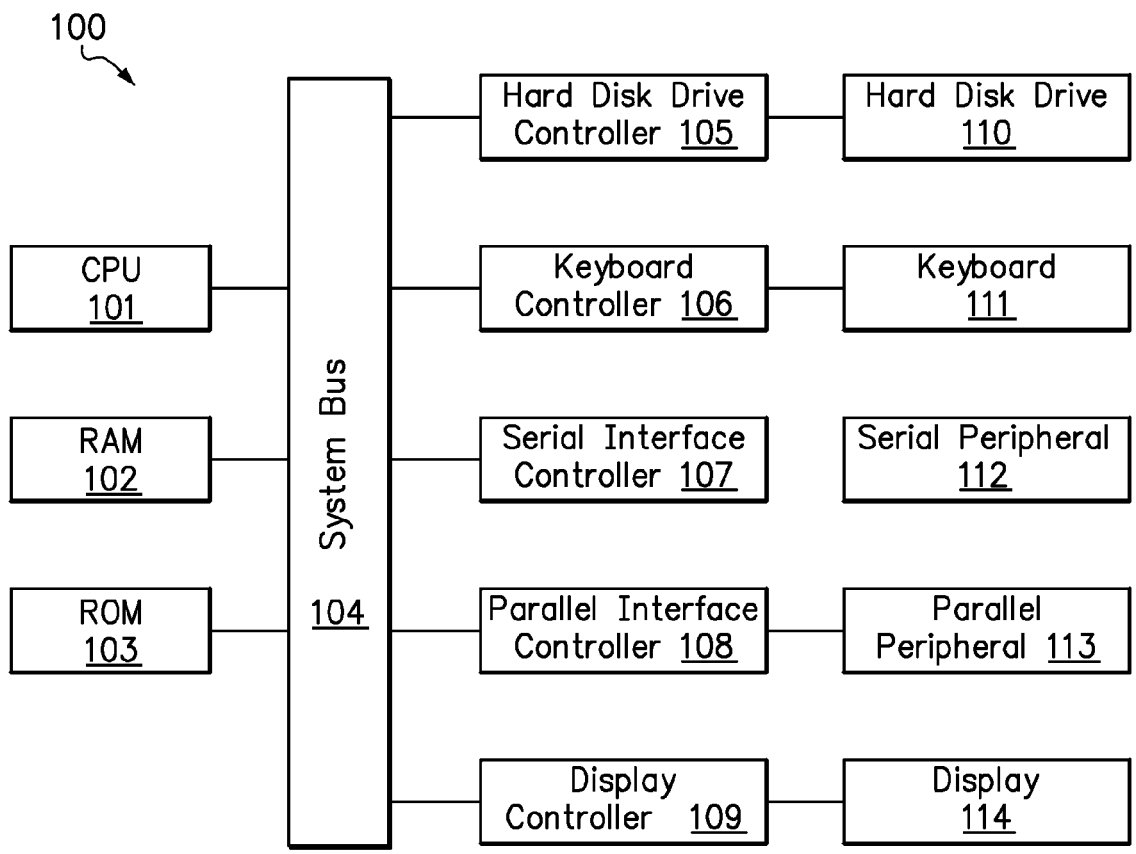
FIG. 1 is a diagram of an exemplary computer system which is applicable to implement the embodiments of the present invention.

FIG. 1 is a diagram of an exemplary computer system 100 which is applicable to implement embodiments of the present invention. For example, the computer system may be a server. As shown in FIG. 1, the computer system 100 includes a CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Disk Drive 110, Keyboard 111, Serial Peripheral Equipment 112, Parallel Peripheral Equipment 113 and a Display 114. Among the above devices, the CPU 101, RAM 102, ROM 103, Hard Drive Controller 105, Keyboard Controller 106, Serial Interface Controller 107, Parallel Interface Controller 108 and Display Controller 109 are coupled to the System Bus 104. The Hard Disk Drive 110 is coupled to Hard Drive Controller 105, the keyboard 111 is coupled to Keyboard Controller 106, the Serial Peripheral Equipment 112 is coupled to Serial Interface Controller 107, the Parallel Peripheral Equipment 113 is coupled to Parallel Interface Controller 108, and the Display 114 is coupled to Display Controller 109. It should be understood that the structure as shown in FIG. 1 is only one example embodiment, and should not be taken as a limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The existing unattended installation process in a host can be divided into two parts. The first part is the preparation process before installing OS, which comprises start-up from a Pre-boot Execution Environment (PXE), configure hardware, upgrade firmware, and connect the hardware with the unattended installation pack to the host. The second part is the OS installation process which comprises all processes between starting up the OS image to enter the OS installation process and completing the OS installation. The time needed in the first part (preparation process) is short while the time needed in the second part (OS installation process) is long, which is real unattended installation without users.

A host system includes a Baseboard Management Controller (BMC) that can be used to provide an interface among the intelligence software of an intelligent management platform, the management software of a controlling system and the hardware of the system thereof, and also to provide self monitoring, event recording, control and recovery functions. The BMC can also be used as the gateway between the system management software, the intelligent platform management bus and the intelligent chassis management bus. The BMC has separate power supply itself, and monitors the system situation. If the BMC finds any abnormal situation of the controlled system, it can take action immediately, for example, record the event, issue an alarm, shut down the system automatically or recover the system automatically. Non-volatile memory is also associated with the BMC, and may be used to save Sensor Data Records (SDR), system event records and unit information, such as serial ID and device ID, etc. The information is transferred to a management micro-controller by assigning a general-purpose, efficient and simple interface based on message in Intelligent Management Platform Interface (IPMI), and thus the hardware and software are separated.

Figure 2:
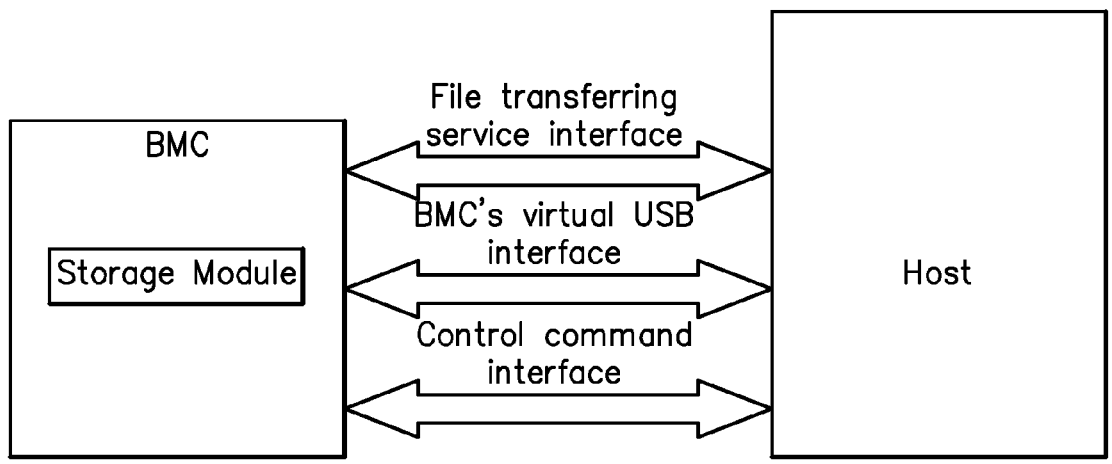
FIG. 2 is a diagram of the interface between a BMC and a host computer system.

FIG. 2 is a diagram of the three interfaces between a BMC and a host. The first interface is a file server interface, the second interface is a BMC's virtual universal serial bus (USB) interface, and the third interface is a control command interface. The file server interface is used to upload and download a file using TFTP/FTP protocol. The BMC's virtual USB interface can create a virtual USB key (flash drive), which can be accessed by the host. The control command interface can be IPMI, CIM or any other type of interface, which is used to request that the BMC execute some specific operation. These three BMC interfaces make it possible for the OS installation to use the BMC in the host to create USB storage, so that no other external storage device or network apparatus is needed. Therefore, the resources required by the OS installation can be reduced.

Figure 3:
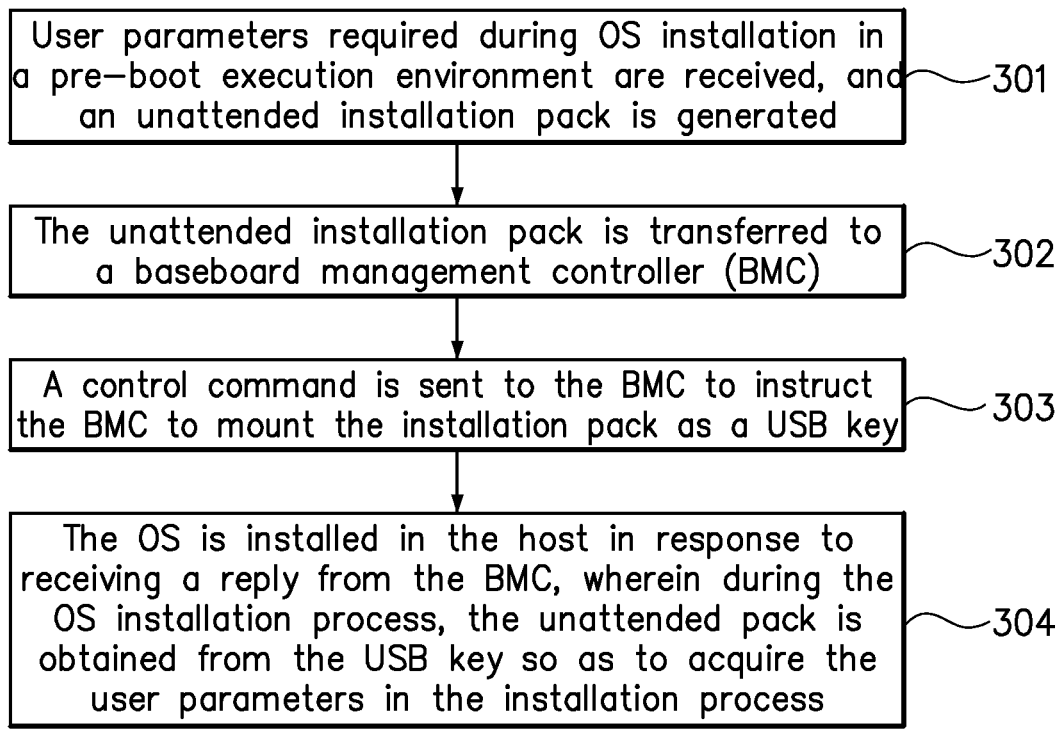
FIG. 3 is a flowchart of a method for installing an operating system in a host computer system according to an embodiment of the present invention.

FIG. 3 is a flowchart of a method for installing an operating system (OS) in a host system according to an embodiment of the present invention. According to FIG. 3, in step 301, user parameters required during OS installation in a pre-boot execution environment are received, for example through manual input from a user or from a pre-defined template. Also in step 301, the unattended installation pack is generated, for example by the host or some other computer or server. In step 302, the unattended installation pack is transferred from the host to a baseboard management controller (BMC). In step 303, a control command is sent from the host to the BMC to instruct the BMC to mount the installation pack as a USB key. The control command may, for example, be a vendor-defined intelligent platform management interface (IPMI) command that mounts the BMC non-volatile memory space as a USB key, such that the unattended installation pack can reside in this memory space. In step 304, the OS is installed in the host in response to receiving a reply from the BMC, such as a reply confirming that the installation pack has been mounted as a USB key. During the OS installation process, the unattended installation pack is obtained from the USB key so as to acquire the user parameters in the installation process.

Pre-boot Execution Environment (PXE) is an executable Environment in the objective deployment system. In PXE, the hardware can be configured, and the OS can be installed by calling OS installation software. PXE is usually started up by running the auto-executable image in an optical disk, PXE, USB or hard disk. In accordance with the present invention, any PXE, such as windows PE or Linux, can be used as the PXE, and there is no need for the PXE to be compatible to the installed OS. In PXE, the user may input all kinds of parameters required during OS installation, such as hard disk format policy, time zone, language selection, etc. A user may configure the hardware environment, such as firmware upgrade, RAID array configuration, Fiber Channel configuration, etc. Any or all of these parameters may be contained in an answer file for the OS installation process in PXE. Also, users can assign the device drivers and/or application installation files after the OS has been installed. In a PXE in accordance with the present invention, the answer file and installed files assigned by the user comprises an unattended installation pack. For example, the unattended installation pack comprises an answer file for the OS installation process. Preferably, the unattended installation pack may also comprise device drivers and/or application installation files.

The format of the answer file in OS installation can be designed by the OS vendor. For example, the answer file may be a readable text file. The file content may include any or all of the user input information required during OS installation, and may also include the path of a device driver of the requested device to insert the device driver. Below is a fragment of a non-limiting example of an answer file, which describes the time zone and language, selected by the installer or user.

```
<TimeZone>China Standard Time</TimeZone>
<InputLocale>0804:00000804</InputLocale>
<SystemLocale>zh-CN</SystemLocale>
<UILanguage>zh-CN</UILanguage>
<UILanguageFallback>zh-CN</UILanguageFallback>
<UserLocale>zh-CN</UserLocale>
```

Referring again to FIG. 3, the unattended installation pack can be directly transferred to the BMC by using the File server interface between the BMC and the host, as described in step 302. In step 303, a control command is sent to the BMC to instruct the BMC to mount the installation pack as a virtual USB key. This step may use the control command interface between the BMC and the host. After receiving the control command, the BMC generates a virtual USB key in the BMC storage area, and will mount the unattended installation pack transferred to the BMC to the virtual USB key.

Then, the BMC will send a response message using the control command interface between the BMC and the host to confirm that a virtual USB key has been generated in the BMC storage area. At step 304, the OS is installed in the host in response to receiving a reply from the BMC, wherein during the OS installation process, the unattended pack is obtained from the USB key so as to obtain the user parameters required in the installation process.

The virtual USB key uses tens to hundreds of megabytes of the BMC storage space. The BMC storage space occupied by the virtual USB key should be released after OS installation is completed, so that the BMC storage can be used by other functional modules, such as the many system management functional modules that are stored there. Thus, in an embodiment, the answer file in the unattended installation pack also comprises applications groups executed during the OS first start-up, and the application groups comprise the instruction file which requests the BMC to un-mount the virtual USB-key and to delete the unattended installation pack. The instruction file can be either a script file, or a file like a batch file, so that the instruction file can be executed during the OS first start-up process after the OS has been installed. Thus, the method in FIG. 3 also comprises the step of starting up the OS for the first time in response to the OS installation being completed, wherein the OS executes the instruction file and sends a command to the BMC requesting the BMC to un-mount the virtual USB-key and delete the unattended installation pack. After the OS installation has completed and OS has started up for the first time, control passes from the BMC to the OS. Accordingly, it should be the OS that sends a command to the BMC to instruct the BMC to un-mount the virtual USB key. Besides, the answer file may include application groups executed during the OS first start-up, and also may include the device driver and/or path of application programs, so that these device drivers and applications programs can be installed directly once the OS is installed.

In another embodiment, in step 304 of FIG. 3, the host installs the OS in response to receiving a response message from BMC, wherein after receiving the BMC response and before installing the OS, the host is required to reboot. In some specific situations, there is no need to reboot the host during install, for example, when installing Windows OS based on WinPE PXE. But in other situations, the reboot is required, on the one hand to check hardware, and on the other hand to initialize the installation process by booting the host using an OS optical disk or OS image. Therefore, in most situations, the host needs to reboot.

Through the method above, a user can input required parameters in PXE, and make the unattended installation running after the OS image start up. During that time, any other external device is not needed, and the user does not need to stand by to answer the questions from the OS installation program.

Figure 4:
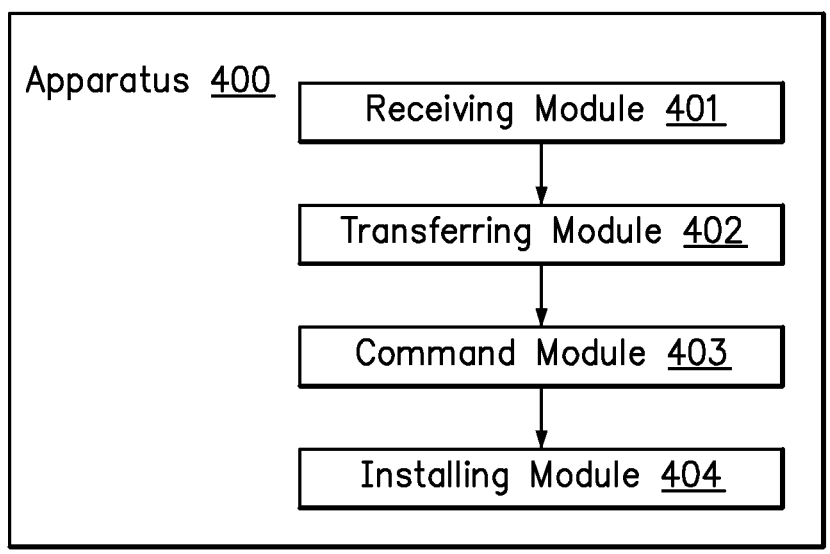
FIG. 4 is a diagram of a system for installing an operating system in a host computer system.

FIG. 4 shows a structure of a system for installing an operating system in a host system. According to FIG. 4, the system comprises: a receiving module 401, configured to receive user parameters required during OS installation in a pre-boot execution environment and generating an unattended installation pack; a transferring module 402, configured to transfer the unattended installation pack to a baseboard management controller (BMC); a command module 403, configured to send a control command to the BMC to instruct the BMC to mount the installation pack as a USB key; and an installing module 404, configured to install the OS in the host in response to receiving a reply from the BMC, wherein during the OS installation process, the unattended installation pack is obtained from the USB key so as to acquire the user parameters in the installation process.

In one embodiment, the unattended installation pack comprises an answer file for the OS installation process, and the answer file comprises the user input parameters required during OS installation in the pre-boot execution environment. In another embodiment, the unattended installation pack also comprises a device driver and/or an application installation file. In a preferable embodiment, the answer file in the unattended installation pack also comprises application groups executed during the OS first start-up, and the application groups comprise the instruction file which requests that the BMC remove the virtual USB key and delete the unattended installation pack. In a further embodiment, the system also comprises: an uninstalling module, configured to start up the OS for the first time in response to the OS installation being completed, wherein the OS executes the instruction file and sends a command to the BMC requesting the BMC to remove the virtual USB key and delete the unattended installation pack.

In one embodiment, the installing module also comprises a rebooting module, configured to reboot the host after receiving a reply from BMC and before installing the OS.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for installing an operating system in a host computer system comprising:

receiving user parameters required during operating system installation in a pre-boot execution environment and generating an unattended installation pack, wherein the unattended installation pack comprises an answer file that includes user input parameters required during operating system installation in the pre-boot execution environment and application groups executed during the operating system first start-up, and wherein the application groups comprise the instruction file which requests the baseboard management controller to un-mount the virtual USB key and delete the unattended installation pack;

transferring the unattended installation pack to a baseboard management controller;

sending a control command to the baseboard management controller to instruct the baseboard management controller to mount the installation pack as a USB key; and installing the operating system in the host in response to receiving a reply from the baseboard management controller and rebooting the host after receiving the reply from the baseboard management controller and before installing the operating system, wherein during the operating system installation process, the unattended pack is obtained from the USB key so as to acquire the user parameters in the installation process.

2. The method of claim 1, wherein the unattended installation pack also comprises a device driver, an application installation file, or both.

3. The method of claim 1, further comprising:

in response to completing the installation of the operating system, starting up the operating system for the first time, wherein the operating system executes the instruction file and sends a command to the baseboard management controller requesting the baseboard management controller to un-mount the virtual USB key and delete the unattended installation pack.

4. A system for installing an operating system in a host system comprising:

a receiving module configured to receive user parameters required during operating system installation in a pre-boot execution environment and to generate an unattended installation pack, wherein the unattended installation pack comprises an answer file for the operating system installation process, and wherein the answer file comprises the user input parameters required during operating system installation in the pre-boot execution environment and application groups executed during the operating system first start-up, and wherein the application groups comprise the instruction file which requests the baseboard management controller to un-mount the virtual USB key and delete the unattended installation pack;

a transferring module configured to transfer the unattended installation pack to a baseboard management controller;

a command module configured to send a control command to the baseboard management controller to instruct the baseboard management controller to mount the installation pack as a USB key; and an installing module, configured to deploy the operating system in the host in response to receiving a reply from the baseboard management controller and rebooting the host after receiving the reply from the baseboard management controller and before installing the operating system, wherein during the operating system installation process, the unattended installation pack is obtained from the USB key so as to acquire the user parameters to be used in the installation process.

5. The system of claim 4, wherein the unattended installation pack also comprises a device driver, an application installation file, or both.

6. The system of claim 4, further comprising:

an uninstalling module configured to start up the operating system for the first time in response to completing installation of the operating system, wherein the operating system executes the instruction file and sends a command to the baseboard management controller to request the baseboard management controller to un-mount the virtual USB key and delete the unattended installation pack.

* * * * *